United States Patent [19]

Ebenstein et al.

[11] Patent Number: 5,414,647

[45] Date of Patent: May 9, 1995

[54] NON-CONTACT METHOD AND SYSTEM FOR BUILDING CAD MODELS BY INTEGRATING HIGH DENSITY DATA SCANS

[75] Inventors: Samuel E. Ebenstein, Southfield; Gregory H. Smith; Paul J. Stewart, both of Ann Arbor, all of Mich.

[73] Assignee: Ford Motor Company, Dearborn, Mich.

[21] Appl. No.: 249,789

[22] Filed: May 26, 1994

Related U.S. Application Data

[63] Continuation-in-part of Ser. No. 980,419, Nov. 23, 1992, Pat. No. 5,384,717, and a continuation-in-part of Ser. No. 161,025, Dec. 3, 1993, Pat. No. 5,319,567.

[51] Int. Cl.$^6$ .............................................. G01C 25/00
[52] U.S. Cl. ..................................... 364/560; 364/561; 382/195
[58] Field of Search .................................. 365/560–563, 365/474.24, 474.26; 382/16, 22; 356/1–3

[56] References Cited

U.S. PATENT DOCUMENTS

| | | | |
|---|---|---|---|
| 4,437,151 | 3/1984 | Hurt et al. | 364/571 |
| 4,488,173 | 12/1984 | Di Matteo et al. | 358/107 |
| 4,525,858 | 6/1985 | Cline et al. | 382/1 |
| 4,613,866 | 9/1986 | Blood | 324/461 |
| 4,645,348 | 2/1987 | Dewar et al. | 356/376 |
| 4,707,647 | 11/1987 | Coldren et al. | 318/568 |
| 4,794,262 | 12/1988 | Sato et al. | 250/560 |
| 4,894,551 | 1/1990 | Kishimoto et al. | 250/560 |
| 4,895,434 | 1/1990 | Stern et al. | 350/484 |
| 4,935,635 | 6/1990 | O'Harra | 356/376 |
| 5,027,281 | 6/1991 | Rekow et al. | 364/474.24 |
| 5,139,338 | 8/1992 | Pomerantz et al. | 356/376 |
| 5,208,763 | 5/1993 | Hong et al. | 364/474.34 |
| 5,218,427 | 6/1993 | Koch | 364/561 |

*Primary Examiner*—Emanuel T. Voeltz
*Assistant Examiner*—Craig Steven Miller
*Attorney, Agent, or Firm*—Roger L. May; Kevin G. Mierzwa

[57] ABSTRACT

Method and system are provided which permits the very precise integration of high density data scans obtained from different part orientations through the use of Horn's method. The data may be obtained from a laser scanner or other methods for obtaining high density data such as Moiré interferometry systems. The method and system use an artificial intelligence technique which permits the very precise determination of the dimensions of analytic features. In the preferred embodiment, the method uses a laser scanner to collect a fine grid of height (z) values of the workpiece. The part is scanned along lines with constant x or constant y. Before the part is scanned, several small reference features are added to the part if needed. These reference features may be small pieces of tape, or small metal washers. Then methods are used to find the precise location of the centers of the reference features. These locations provide the necessary input to Horn's method so local coordinate systems for each scan can be mapped to a single global coordinate system.

17 Claims, 8 Drawing Sheets

NON-CONTACT METHOD AND SYSTEM FOR BUILDING CAD MODELS BY INTEGRATING HIGH DENSITY DATA SCANS

CROSS-REFERENCE TO RELATED APPLICATIONS

This application is a continuation-in-part application of both U.S. application Ser. No. 980,419, filed Nov. 23, 1992, now U.S. Pat. No. 5,384,717, entitled "Non-Contact Method Of Obtaining Dimensional Information About An Object", and U.S. application Ser. No. 161,025, filed Dec. 3, 1993, now U.S. Pat. No. 5,319,567, entitled "Non-Contact Method Of Obtaining Dimensional Information About A Reference Feature Of An Object", both of which are assigned to the assignee of the present application, and both of which are hereby incorporated in their entirety by reference.

TECHNICAL FIELD

This invention relates to non-contact methods and systems for building CAD models and, in particular, to non-contact methods and systems for building CAD models by integrating high density data scans.

BACKGROUND ART

Various methods and systems are available for collecting three dimensional data for volumetric digitization of a three dimensional object. This data can be obtained from non-contact devices such as a laser scanner, or camera based Moiré interferometry systems. These systems have a problem that they cannot collect data from regions which are out of the line of sight. Therefore, the object from which the data is collected must be oriented in different positions so that parts of the object which are invisible to the data collection device from one orientation will be visible in another, as illustrated in U.S. Pat. No. 4,894,551. This, however, creates a problem with integrating the data sets which have been collected from different orientations.

One solution to the problem of three dimension data collection is use of a device such as described in U.S. Pat. No. 5,139,339. However, this device is destructive, the data is collected but the part is destroyed in the process. For many applications, part destruction is not a viable option.

Another possibility is to very carefully determine precise part orientation during part setup before data collection with some specialized equipment such as a rotary table. However, precise part orientation is very difficult to achieve.

Another method requires a part to have several locating features such as spherical balls. Coordinate measuring machines are used to accurately determine the center of these balls, and this information can be used to determine coordinate transformations to transform data from one coordinate system to another. A touch probe and operator action is required to find several points on the surface of each ball. Standard mathematical techniques can then be used to calculate the ball's center and radius.

SUMMARY OF THE INVENTION

An object of the present invention is to provide a non-contact method and system for building CAD models by integrating high density data scans without requiring any specialized hardware for precise part orientation.

Another object of the present invention is to provide a non-contact method and system for building CAD models by integrating high density data scans wherein the scan data may be taken from unknown orientations and is independent of any particular scan method or device.

Still a further object of the present invention is to provide a non-contact method and system for building CAD models by integrating high density data scans from different coordinate systems wherein naturally occurring reference features and/or artificial reference features on an object are utilized to integrate the scan data into a global coordinate system.

In carrying out the above objects and other objects of the present invention, a method is provided for building a CAD model which represents an object positioned at a scanning station. The method includes the step of generating reference data relating to a surface of the object to be scanned. The surface includes at least one reference feature of the object and the at least one reference feature has a boundary. The method also includes the steps of scanning the surface of the object at the scanning station based on the reference data to generate reflected signals, converting the reflected signals to corresponding electrical signals and computing scan data based on the electrical signals. The method also includes the step of determining at least a portion of the boundary of the at least one reference feature based on the scan data to obtain boundary data and determining the at least one reference feature of the object in a local coordinate system based on the boundary data. Then, the above-noted steps are repeated for another surface of the object to obtain the location of the at least one reference feature in a second local coordinate system different from the first local coordinate system. Then the method includes the steps of comparing the locations of the at least one reference feature in the coordinate systems to obtain a transform and mapping the scan data into a global coordinate system based on the transform and integrating the scan data in the global coordinate system to obtain a CAD model of the object.

Preferably, each surface includes at least four reference features and wherein the step of comparing is performed utilizing Horn's method.

Also, preferably, the at least four reference features have locations which are non-collinear and, still preferably, are non-coplanar.

Still further in carrying out the above objects and other objects of the present invention, a system is provided for carrying out each of the above method steps.

The method and system of the present invention provide numerous advantages. For example, the present invention can be used with data collected from any data collection device. The method and system do not require any specialized hardware and allow the operator to orient the object to be digitized in any orientation he or she desires so that the data is visible. The problem of integrating data from different orientations is totally transparent to the operator when setting up the part for data collection. The operator can fixture the part in any chosen orientation. The operator can use as many orientations as he or she wishes to collect all of the desired data. The problem of updating integration is solved in the computer after data collection has been finished.

The method and system uses analytic features such as holes which are found at many objects such as engine cylinder heads where data is collected for engineering applications. If the object does not contain enough reference features such as holes, small metal objects such as washers, or other small objects can be easily attached to the object as locating features.

Using the methods described in the above-noted patent applications, one can use these locating or reference features to determine the precise location of these features in any given data collection orientation. The method and system uses the precise location of these features to establish a coordinate system which uniquely determines the data collection coordinate system. By comparing the coordinates of these features in the two distinct coordinate systems of two distinct data collection orientations, one can easily transform all of the data to a common global coordinate system.

Yet still another advantage of the method and system is that it allows for future data collection and integration with data previously collected. For example, if data is collected in three specific orientations, and later it is found that some data was invisible or obstructed in all of the three orientations, new data can be collected in a fourth orientation and integrated with the previous three sets of data.

This can be contrasted with the prior art methods and systems where each prior art method and system is basically a specific scanning method for obtaining scanned data for an object set in the fixed orientation or known set of orientations. Only with the present invention are multiple sets of scan data capable of being integrated from unknown orientations and independent of any particular scan method.

In general, the present method and system permit the very precise integration of high density data scans obtained from different part orientations utilizing a particular computational algorithm. The data may be obtained from a laser scanner or other methods for obtaining high density data such as Moiré interferometry systems.

In general, the invention may be practiced by:
1. Determine how many views or orientations of the part will be necessary to collect all part geometry.
2. Make sure that four or more reference features are visible in each adjacent view. For example, suppose it is necessary to scan a part from three orientations say $V_1$, $V_2$, $V_3$ and we have reference features (A,B,C,D,E,F,G) with
   features (A,B,C,D,E) visible in $V_1$,
   features (B,C,D,E,F) visible in $V_2$,
   features (C,D,E,F,G) visible in $V_3$.
   Then Horn's method can be used to first map data collected from $V_3$ to the coordinate system of $V_2$, and then again to map data from the $V_2$ coordinate system to that of $V_1$.
3. Select a convenient global coordinate system and use Horn's method to map all data to this coordinate system.
4. Use any of several methods to input the data to a CAD system to build the CAD model.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Introduction

Laser scanning techniques can be used to capture the free-form surface geometry of engine components such as combustion chambers, valve guides or intake and exhaust ports as well as other automotive components such as steering wheels, body panels or even the features of crash test dummies. The characteristics of these free-from surfaces are usually complex enough so that accurate representation requires a large number of high density scan data points. Furthermore, it is often impossible to capture the geometry of an entire part with a single scan. A part may have to be scanned from several viewpoints to capture all of the geometric features.

The methods presented herein can be used to accurately reference separate scans of a single part taken from independent local coordinate systems and integrate them into a uniform global coordinate system. The collective scan data is then suitable for importing into a CAD system to build a CAD model.

Figure 1:
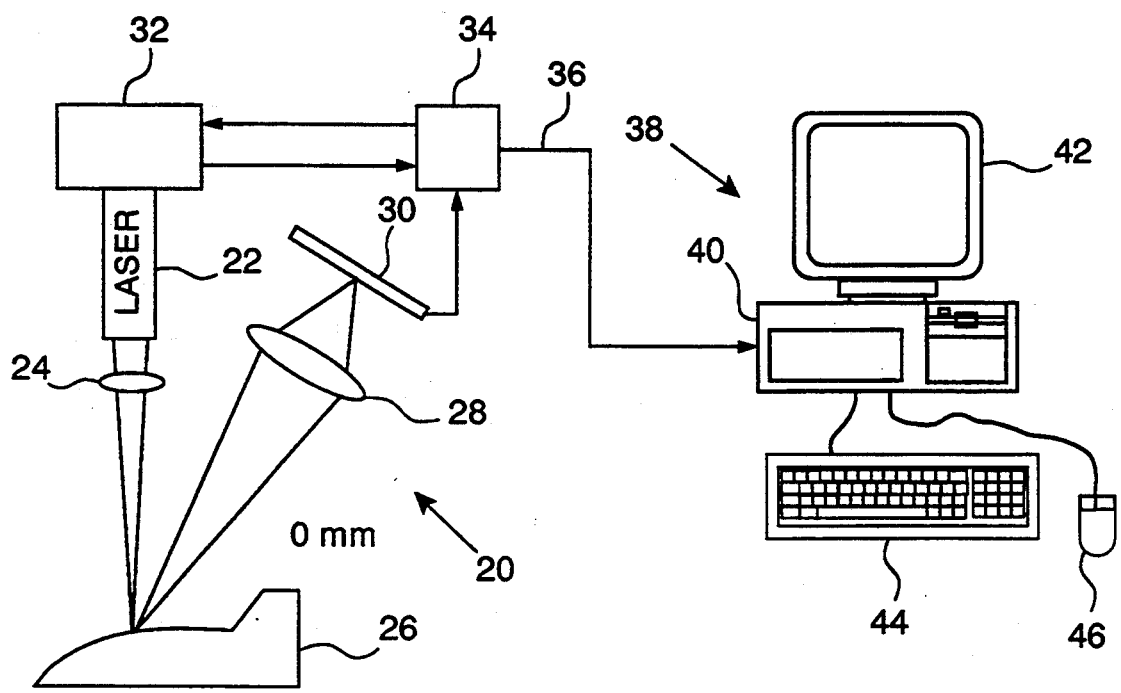
FIG. 1 is a schematic view of a laser scanner operation in accordance with the present invention.

Referring now to the drawing figures, there is illustrated the method and system of the present invention. In FIG. 1, a laser scanner, generally indicated at 20, operates on the triangulation principle. A beam of laser light is generated by a laser 22 and is focused by a lens 24 on a part 26 being scanned to produce an illuminated spot of approximately 0.2 mm in diameter. An image of this spot is viewed by an "eye" or lens 28 that focuses the spot image on a sensor 30 mounted at an angle to the axis of the laser beam. The sensor 40 contains a linear array of 1024 photodetectors or photodiodes. The position at which the image of the spot falls on the array is a function of the distance of the point being scanned to the scanner 20. The number of photodetectors illuminated will vary as the angle of the surface of the part 26 varies. In general several photodetectors will be illuminated. The light intensity for each photodetector illuminated is used to compute the centroid of the spot image and thus achieve an accurate measurement independent of the surface angle. Since the size of the sensor 30 is limited, there is a limited range in which the scanner 20 can operate and maintain the spot image on the sensor 30.

This determines the depth of field for the scanner 20. A typical depth of field is 6 mm.

In operation, the laser scanner 20 is mounted in the spindle of a vertical machining center 32 and is moved over the surface of the part 26 being scanned by the center's X and Y axes in a series of linear scans.

The laser scanner 20 communicates with a controller 34 of the machining center 32 and adjusts the Z axis to maintain the scanner 20 within a 6 mm depth of field. The Z dimension returned along a line 36 from the scanning system is then the algebraic sum of the Z axis servo move and the position given by the laser scanner 20. The Z dimension is input to a computer work station, generally indicated at 38. The work station 38 includes a chassis 40, a display screen 42, a keyboard 44 and a mouse 46, all connected in a typical fashion. The work station is programmed to have a graphical user interface.

A prediction algorithm may be employed to move the scanner 20 up or down based on the last series of points scanned. This system works effectively for smoothly varying contours of parts and allows up to 70 points a second to be scanned.

However, when a discontinuity in the surface of a part is encountered, like the vertical wall of a hole, the system must search up and down until the spot falls on the sensor. This searching is the most time-consuming part of the scanning operation since it may take several seconds for the system to search out the new depth if the change is large.

When scanning a part, a user first defines the polygonal boundary of the area of the part 26 to be scanned (preferably up to 100 points). This boundary may be defined by inputting X,Y coordinates or by moving the laser probe to the points in a "teach" mode. This distance between points along a scan and the distance between scan lines is also user selectable down to 0.02 min. Rectangular grids are usually specified but are not required.

Scan Integration

Figure 2:
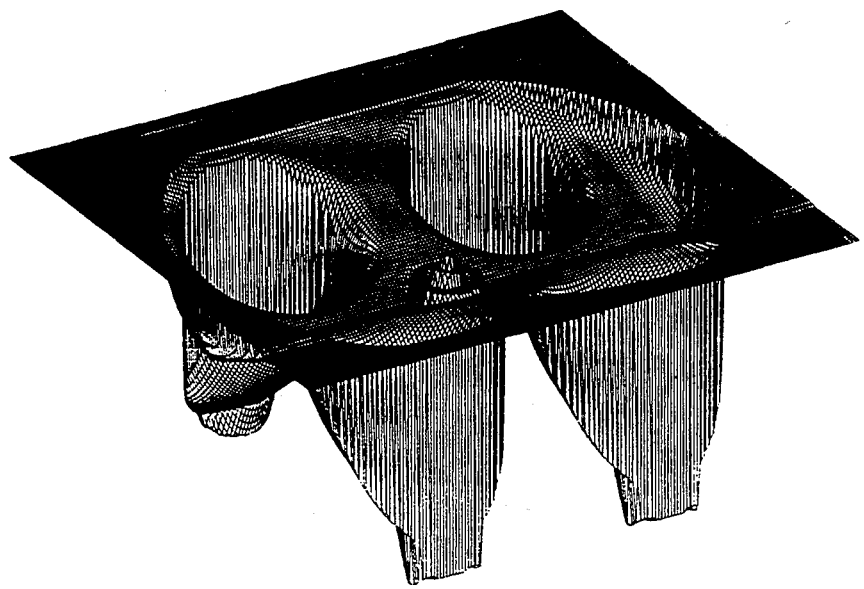
FIG. 2 is a scan data grid of an engine block viewing the combustion chamber.
Figure 3:
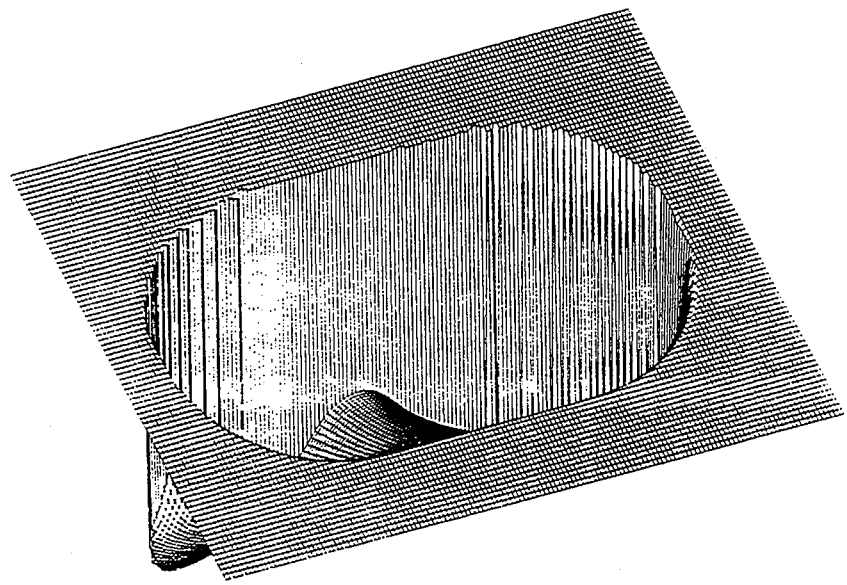
FIG. 3 is a scan data grid of an engine block viewing an exhaust port.
Figure 4:
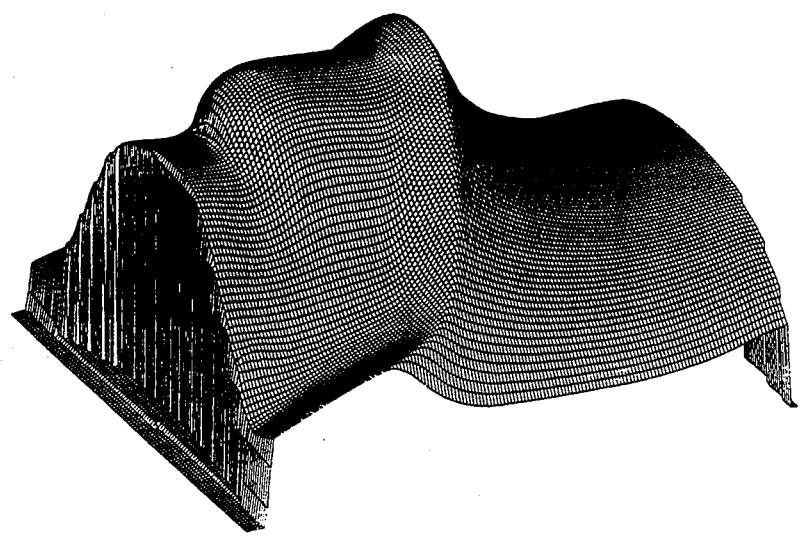
FIG. 4 is a scan data grid of a crash dummy neck viewing the front of the crash dummy.
Figure 5:
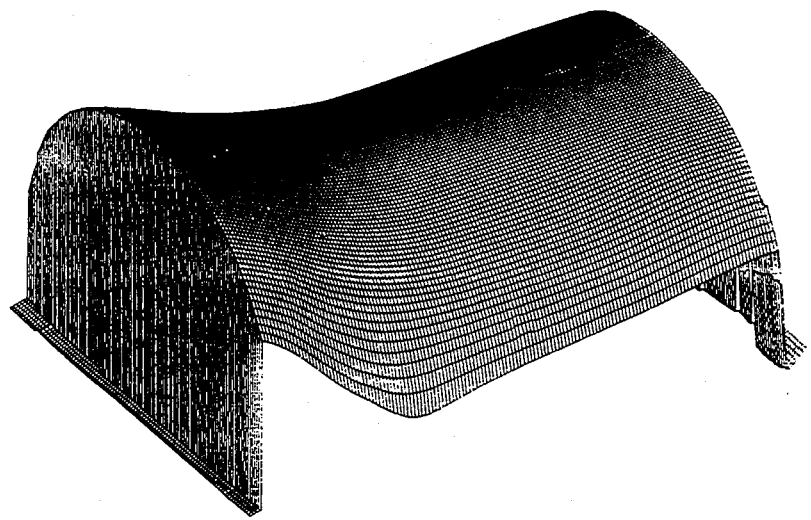
FIG. 5 is a scan data grid of a crash dummy neck viewing the back.
Figure 6:
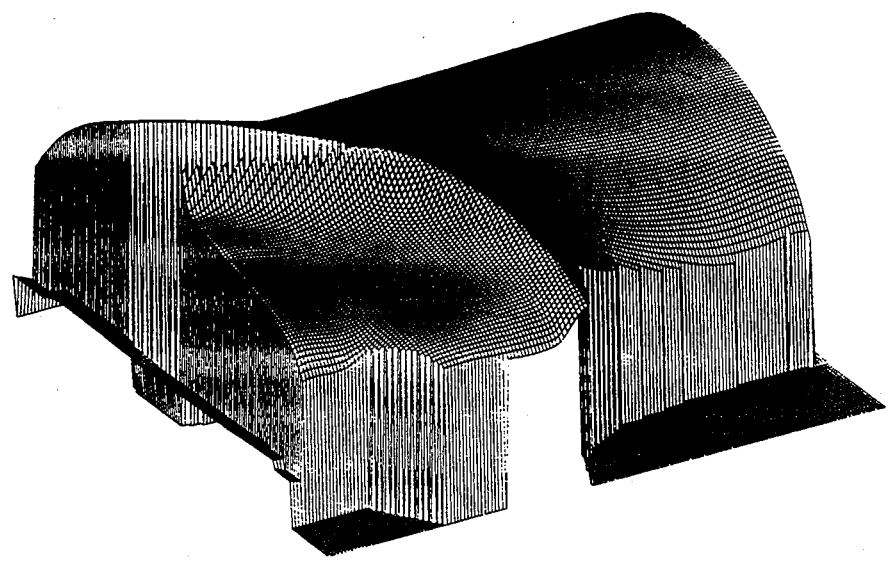
FIG. 6 is a scan data grid of a crash dummy neck viewing the left portion of the crash dummy neck.
Figure 7:
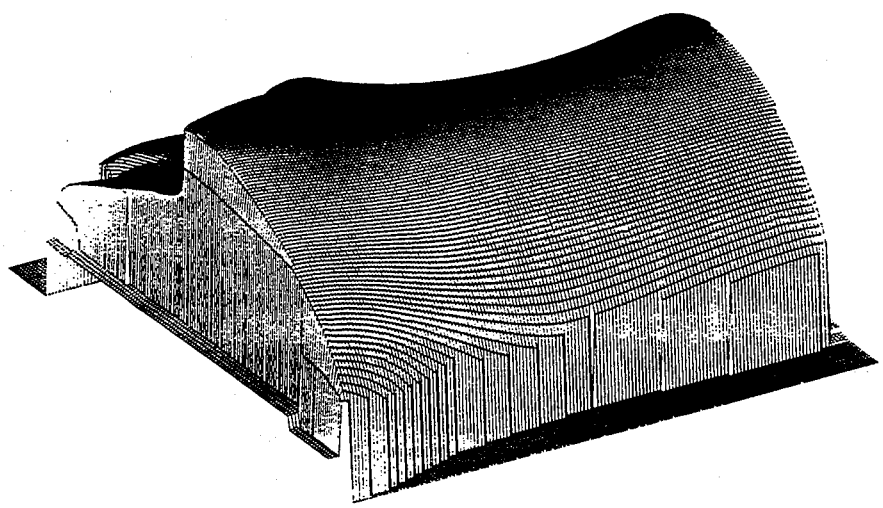
FIG. 7 is a scan data grid of a crash dummy neck viewing the right portion of the crash dummy neck.

A typical laser scanner is based on a line of sight principle (i.e. a single scan can only measure regions of an object visible along a line of sight perpendicular to the scan plane). In scanning a combustion chamber, for example, it is impossible to see the intake and exhaust ports simultaneously. It is therefore necessary to take several scans of the engine block from different orientations to capture all of the geometry required. An example chamber and port scan is given in FIGS. 2 and 3.

The significant advantage to the technique described herein is that no record of part orientation is required. A part may be scanned, completely removed from the scan device and then refixtured and scanned at a later time with no loss in accuracy. Rescanning may even occur on a different device. This is particularly useful when important geometric features are on opposite sides of an object. An example of this is seen in FIGS. 4, 5, 6 and 7 where the neck of a crash dummy has been rotated to capture the views of the front, back, left and right sides, respectively. A second example of scanning from opposite sides is the solid prototype steering wheel shown in FIGS. 8 and 9.

The General Application of Horn's Method

To integrate scans taken from different viewpoints, it is necessary to reference the local coordinate systems of the individual scans to a single global coordinate system. The choice of the global coordinate is arbitrary, but for the method described here it is a coordinate system of one of the individual scans. The challenge is to determine the transformation from an individual coordinate system to the selected global system. In cases where there are no direct references between coordinate systems, such as the front and back of the steering wheel, intermediate transformations must be calculated. Horn's method is fully described in B. K. P. Horn, H. M. Hilden, and S. Negahdaripour, "Closed-Form Solution Of Absolute Orientation Using Orthonormal Matrices", J. OPT. SOC. AM. A, 5: 1127–1135, July 1988. Horn's method can be applied in either case to determine the precise transformation matrix required to map from one coordinate system to the next.

Horn's method can be stated mathematically as follows: given a set of D of n points in a coordinate system L, where n>=4 and an element of D is $p_i=(x_i,y_i,z_i)$, and given a conjugate set of points in the coordinate system L' with coordinates $p_i'=(x_i',y_i',z_i')$, determine the linear transformation A which minimizes $$\Sigma_{i=1}^{n} \| P_i' - AP_i \|^2 \tag{1}$$

where $\| \ \|$ denotes the normal Euclidean norm in $R^3$.

In general, a minimization is required because the sum in Equation (1) is not zero, due to errors in measurement. Therefore, Horn's method requires the precise location of four or more points in the global coordinate system, and the location of the corresponding points in the local coordinate system. The selection of the matching points is important to the accuracy of the transformation matrix, A. In addition, the points must be located such that there is a unique mapping between the two coordinate spaces. In other words, the points must be linearly independent. For example, if all points are at a single vertex or along a single line, this will result in singularities in the mapping. To avoid even a near singular solution, the points should be distributed as far from linear, and even planer, as possible.

Given these restrictions, the location of matching points in each view can be difficult. Furthermore, high density laser scanning is a statistical process that does not allow individual points to be identified. Specific reference points are located by identifying geometric features in the patterns of data points from the scan image. Thus, locating points (conjugate reference points) are features on the scan object such as edge intersections or the centers of holes. However, the natural locating points of mechanical parts are often set in straight lines. The problem is compounded with free-form surfaces because there are not natural locating points just smooth surfaces.

In extreme cases, such as the combustion chamber and exhaust port, the views have no overlapping regions at all. In these instances, it is necessary to add artificial locating features to the scanned object.

Addition of Artificial Locating Features

The free-form surface of a neck of a crash dummy offers no natural locating features so small thin pieces of mylar tape may be placed in the overlapping regions of the four scans.

Figure 10:
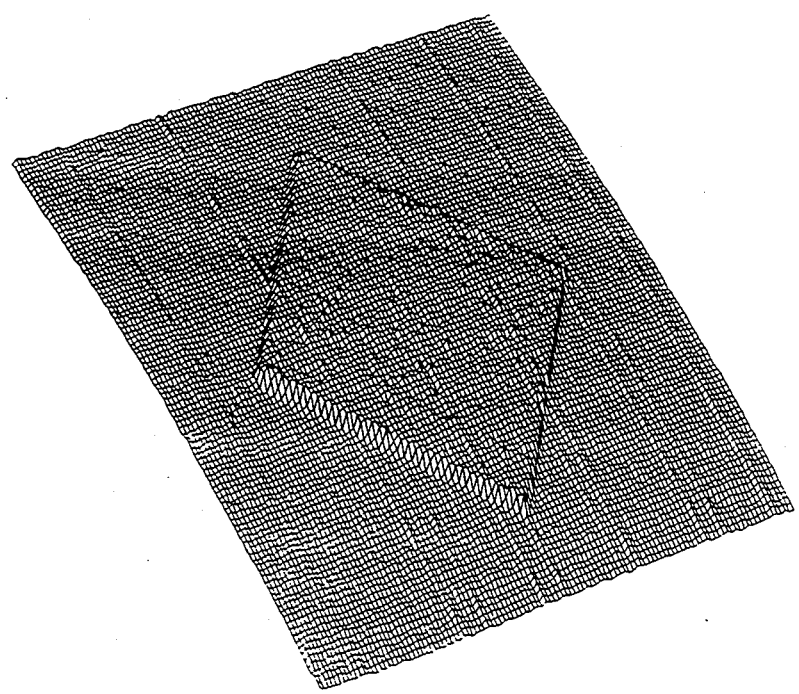
FIG. 10 is a mylar rectangle on the next surface as captured by a laser scan.

In one example, sixteen rectangles were used in total. The locating points were then found by examining the scanned patches, like that seen in FIG. 10, and taking the centroid of the four corners.

Horn's method was then used to calculate the necessary coordinate transformations and intermediate transformations to integrate the four coordinate systems. The data and resultant transformation data were very precise, with the error in point transformations ranging from 0.01% to 0.06% relative to the distance mapped. However, computation of the rectangle centroids required more manual labor than desired. The method was improved by using the algorithm described in the first above-noted patent application to calculate the center of circular features found in scan data.

Figure 11:
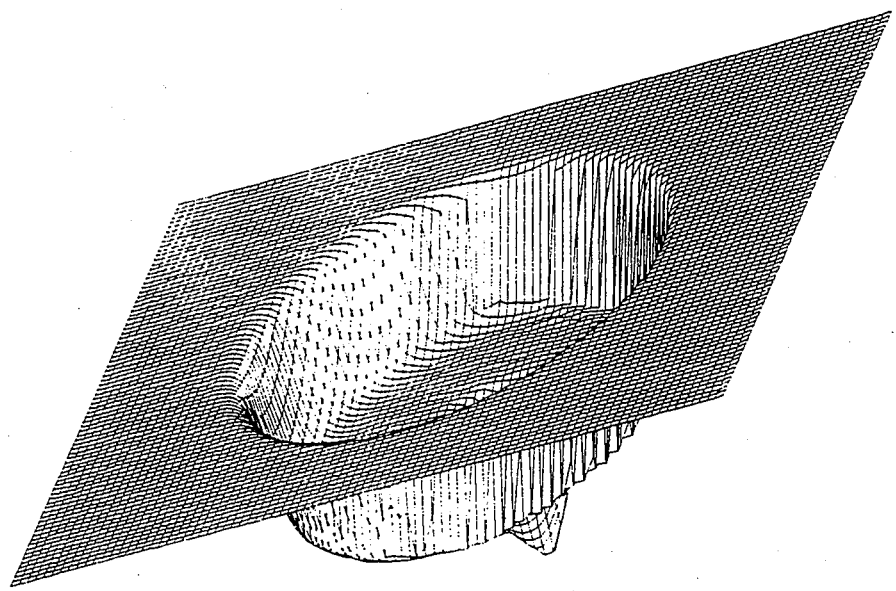
FIG. 11 is a hole in the top of an engine block as captured by a laser scan.
Figure 12:
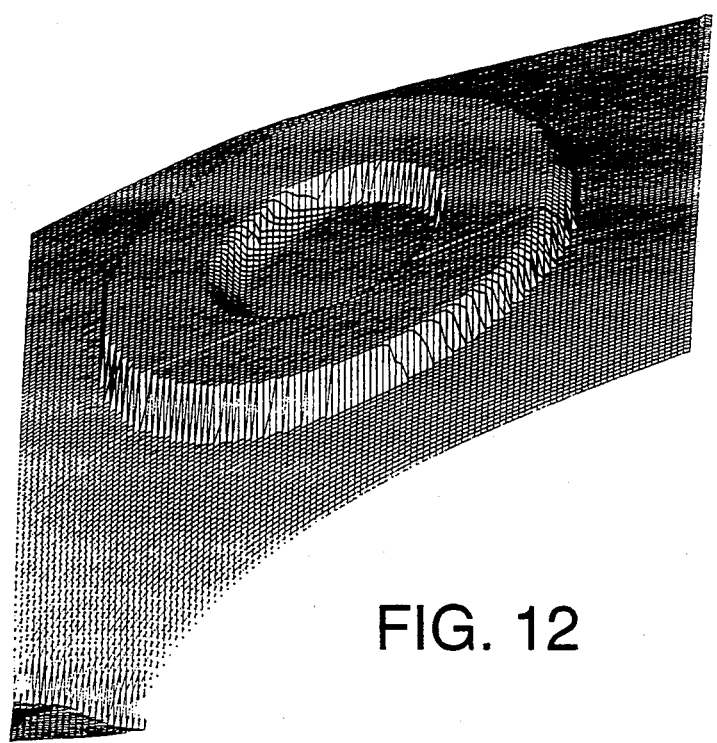
FIG. 12 is a steel washer as captured by a laser scan.

An engine block has many existing holes from which to select suitable locating features. One example is shown in FIG. 11. In the case of the steering wheel, metallic circular washers were substituted for the mylar tape used on the crash dummy neck. An example scan of a washer is given in FIG. 12. The circular feature locating scheme proved successful as the errors were in a range of 0.005% to 0.06%, similar to that of the crash dummy. Furthermore, no manual calculations are required to locate the circular features.

CAD Models

Figure 13:
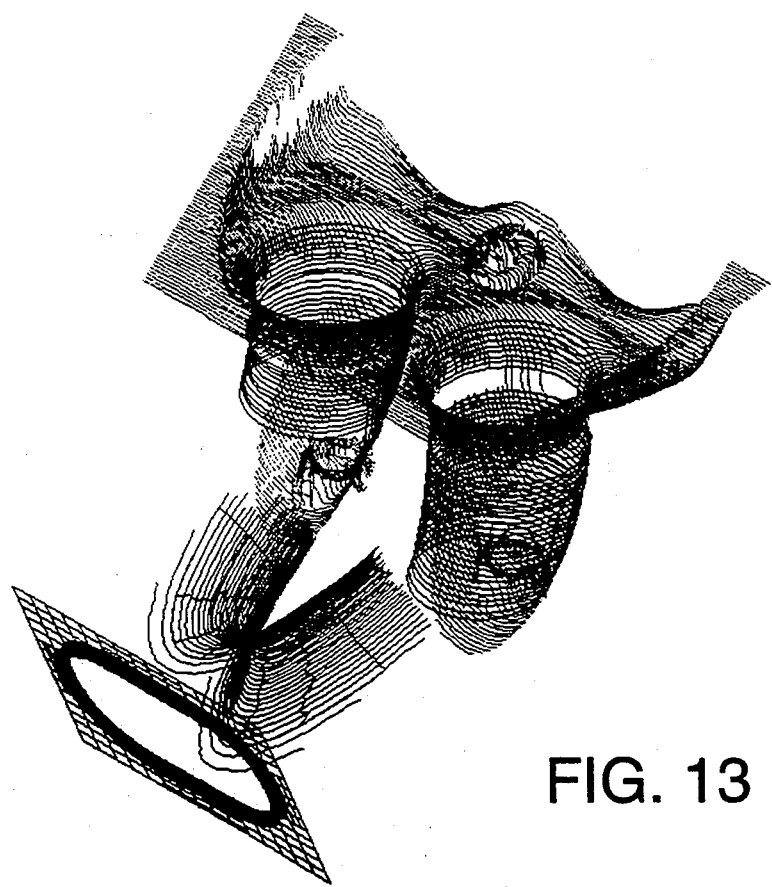
FIG. 13 is a wire frame CAD model linking a cylinder head chamber and ports.

The described techniques have been applied successfully to the three examples given. FIG. 13 shows the integration of four separate scans used to describe a combustion chamber. The scans include the chamber and port from FIGS. 2 and 3 plus additional scans taken down the dual exhaust ports and over the exhaust flange.

Figure 14:
FIG. 14 is an interior and exterior surface of a CAD model of a crash dummy neck.

The data forming the neck piece of the crash test dummy was also integrated using Horn's method, but as FIG. 14 shows, the piece is hollow. Data describing the interior surface was gathered with a touch probe CMM (Coordinate Measuring Machine) as were the coordinates of the locating features. The CMM data was then integrated with the laser scan data using the algorithms described herein. A CMM is not well suited to custom work such as this. The data required approximately four man-hours and eight total-hours to gather, however, the interior surface is largely occluded making laser scanning more difficult.

Figure 8:
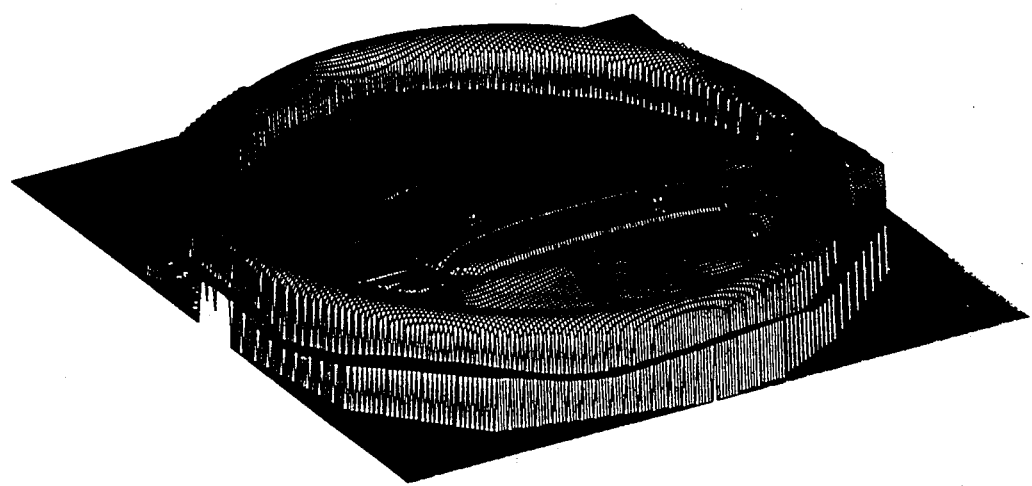
FIG. 8 is a scan data grid of a steering wheel viewing the top of the steering wheel.
Figure 9:
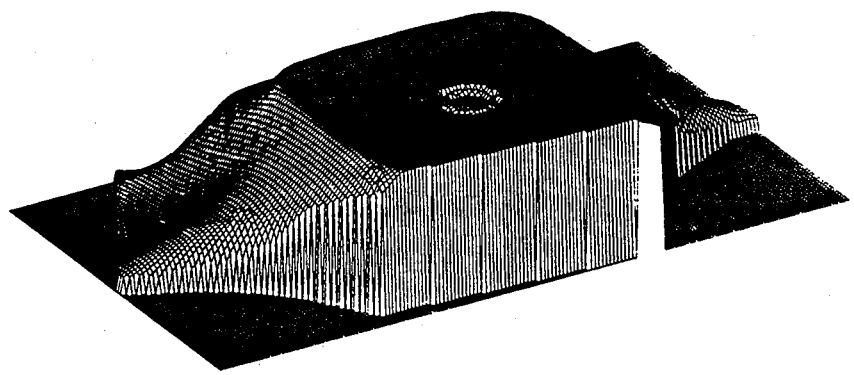
FIG. 9 is a scan data grid of a steering wheel viewing the bottom of the steering wheel.
Figure 15:
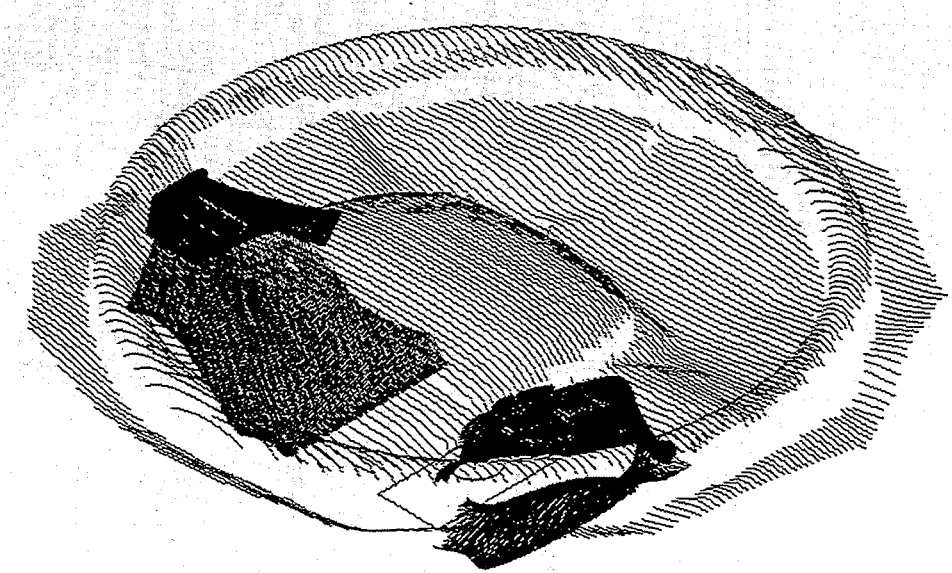
FIG. 15 is a wire frame CAD model of the upper and lower surfaces of a steering wheel.

FIG. 15 shows a wire frame model of a steering wheel formed from the front and rear scans shown in FIGS. 8 and 9. However, two additional scan viewpoints were required to create the two intermediate transformations used to relate the front and rear surface scans. The data was ultimately used to find the electronic package size available for controls mounted on the steering wheel arm.

Conclusion

Integration of high density data scans is essential for building CAD models of complex parts. The techniques described herein, using Horn's method, can be used to calculate the geometric transformation between two scans if conjugate pairs of reference points are available. If an object has insufficient natural locating features to provide the necessary conjugate pairs, such reference features can be added. The centroids of metal washers have been used as locating features in several examples.

While the best mode for carrying out the invention has been described in detail, those familiar with the art to which this invention relates will recognize various alternative designs and embodiments for practicing the invention as defined by the following claims.

We claim:

1. A method of building a CAD model which represents an object positioned at a scanning station, the method comprising the steps of:
   a) generating reference data relating to a surface of the object to be scanned, the surface including at least one reference feature of the object, the at least one reference feature having a boundary;
   b) scanning the surface of the object at the scanning station based on the reference data to generate reflected signals;
   c) converting the reflected signals to corresponding electrical signals;
   d) computing scan data based on the electrical signals;
   e) determining at least a portion of the boundary of the at least one reference feature based on the scan data to obtain boundary data;
   f) determining the location of at least one reference feature of the object in a local coordinate system based on the boundary data;
   g) repeating steps a)-f) for another surface of the object to obtain the location of the at least one reference feature in a second local coordinate system different from the first local coordinate system;
   h) comparing the locations of the at least one reference feature in the coordinate systems to obtain a transform;
   i) mapping the scan data into a global coordinate system based on the transform; and
   j) integrating the scan data in the global coordinate system to obtain a CAD model of the object.

2. The method as claimed in claim 1 wherein each surface includes at least four reference features and wherein the step of comparing is performed utilizing Horn's method.

3. The method as claimed in claim 2 wherein the at least four reference features have locations which are non-collinear.

4. The method as claimed in claim 3 wherein at least four reference features have locations which are non-coplanar.

5. The method as claimed in claim 1 further comprising the step of repeating steps a)-f) for another surface of the object to obtain the location of the at least one reference feature in a third local coordinate system and then repeating steps h)-j) to obtain the CAD model of the object.

6. The method as claimed in claim 1 wherein the local coordinate systems are independent of one another.

7. The method as claimed in claim 1 wherein the global coordinate system is one of the local coordinate systems.

8. The method as claimed in claim 1 wherein the transform is a transformation matrix.

9. A system for building a CAD model which represents an object positioned at a scanning station, the system comprising:
   means for generating reference data relating to surfaces of the object to be scanned, each of the surfaces including at least one reference feature of the object, the at least one reference feature having a boundary;

means for scanning the surfaces of the object at the scanning station based on the reference data to generate reflected signals;

means for converting the reflected signals to corresponding electrical signals;

means for computing scan data based on the electrical signals;

means for detecting at least a portion of the boundary of the at least one reference feature based on the scan data to obtain boundary data;

means for determining the locations of at least one reference feature of the object in local coordinate systems based on the boundary data;

means for comparing the locations of the at least one reference feature within each of the local coordinate systems to obtain a transform;

means for mapping the scan data into a global coordinate system based on the transform; and means for integrating the scan data in the global coordinate system to obtain a CAD model of the object.

10. The system as claimed in claim 9 wherein each surface includes at least four reference features and wherein the means for comparing includes means for performing Horn's method on the locations of the at least one reference feature.

11. The system as claimed in claim 10 wherein the at least four reference features have locations which are non-collinear.

12. The system as claimed in claim 11 wherein the at least four reference features have locations which are non-coplanar.

13. The system as claimed in claim 9 wherein the coordinate systems are independent of one another.

14. The system as claimed in claim 9 wherein the global coordinate system is one of the local coordinate systems.

15. The system as claimed in claim 9 wherein the transform is a transformation matrix.

16. The method as claimed in claim 1 wherein the at least one reference feature has a curved area defined by a radius and a center and wherein the locations are defined by the coordinates of the center in the local coordinate systems and wherein the step of determining the location of the at least one reference feature includes the steps of estimating the coordinates of the center and the radius from the boundary data and correcting the estimated radius to obtain the value of the radius.

17. The system as claimed in claim 9 wherein the at least one reference feature has a curved area defined by a radius and a center and wherein the location of the at least one reference feature includes the coordinates of the center in the local coordinate system and wherein the step of determining the location of the at least one reference feature includes the steps of estimating the coordinates of the center from the boundary data and correcting the estimated radius to obtain the value for the radius.

* * * * *